United States Patent
Tsai

(10) Patent No.: US 9,621,055 B2
(45) Date of Patent: Apr. 11, 2017

(54) CONTROLLER WITH LEAKAGE CURRENT PROTECTION OF A DIODE AND OPERATION METHOD THEREOF

(71) Applicant: Leadtrend Technology Corp., Hsin-Chu (TW)

(72) Inventor: Yi-Chuan Tsai, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 36 days.

(21) Appl. No.: 14/841,683

(22) Filed: Aug. 31, 2015

(65) Prior Publication Data

US 2016/0065078 A1    Mar. 3, 2016

Related U.S. Application Data

(60) Provisional application No. 62/044,320, filed on Sep. 1, 2014.

(51) Int. Cl.
| | |
|---|---|
| *H02M 3/335* | (2006.01) |
| *H02M 7/757* | (2006.01) |
| *H02M 1/32* | (2007.01) |
| *H02M 1/00* | (2006.01) |

(52) U.S. Cl.
CPC .......... *H02M 3/33507* (2013.01); *H02M 1/32* (2013.01); *H02M 2001/0051* (2013.01); *Y02B 70/1433* (2013.01)

(58) Field of Classification Search
CPC ........... H02M 2001/0025; H02M 1/08; H02M 3/325; H02M 3/335; H02M 3/33507; H02M 3/33515; H02M 3/33523

USPC .......................... 363/21.15, 21.16, 21.18, 79
See application file for complete search history.

(56) References Cited

U.S. PATENT DOCUMENTS

| | | | | |
|---|---|---|---|---|
| 2004/0145924 | A1* | 7/2004 | Jang ........................ | H02M 1/36 363/20 |
| 2010/0073967 | A1* | 3/2010 | Tatsukawa ........ | H02M 3/33507 363/21.18 |
| 2010/0225293 | A1* | 9/2010 | Wang ................. | H02M 3/33507 323/290 |
| 2013/0003421 | A1* | 1/2013 | Fang .................. | H02M 3/33523 363/21.01 |

* cited by examiner

*Primary Examiner* — Adolf Berhane
*Assistant Examiner* — Gary Nash
(74) *Attorney, Agent, or Firm* — Winston Hsu; Scott Margo

(57) ABSTRACT

A controller with leakage current protection of a diode includes a comparison unit, a reference voltage generation unit, a time out signal generation unit, and a gate signal generation unit, wherein the diode is applied to a secondary side of a power converter. The comparison unit outputs a corresponding selection signal according to a compensation voltage and a threshold. The reference voltage generation unit outputs a corresponding reference voltage range according to the corresponding selection signal. The time out signal generation unit determines a corresponding time out according to the corresponding selection signal, and generates a corresponding time out signal when a voltage corresponding to an auxiliary winding has no peak to cross an upper limit of the corresponding reference voltage range during the corresponding time out. The gate signal generation unit enters the leakage current protection or a quasi-resonant mode according to the corresponding time out signal.

21 Claims, 12 Drawing Sheets

CONTROLLER WITH LEAKAGE CURRENT PROTECTION OF A DIODE AND OPERATION METHOD THEREOF

CROSS REFERENCE TO RELATED APPLICATIONS

This application claims the benefit of U.S. Provisional Application No. 62/044,320, filed on Sep. 1, 2014 and entitled "Detection of the Reverse Leakage Current on Output Diode," the contents of which are incorporated herein by reference.

BACKGROUND OF THE INVENTION

1. Field of the Invention

The present invention relates to a controller with leakage current protection of a diode and an operation method thereof, and particularly to a controller and an operation method thereof that not only can have lower cost, but can also quickly enter leakage current protection when a diode has a leakage current.

2. Description of the Prior Art

Nowadays, a flyback power converter is one of the most popular power converters, wherein operational principles of the flyback power converter are that the flyback power converter stores energy and a reverse bias is crossed on a diode coupled to a secondary side of the flyback power converter when a power switch of a primary side of the flyback power converter is turned on; and the flyback power converter releases the energy to the secondary side of the flyback power converter and a forward bias is crossed on the diode when the power switch is turned off. However, when the flyback power converter operates with a heavy load coupled to the secondary side of the flyback power converter for a period of time, a temperature of the diode is increased so that the diode may not block the reverse bias when the power switch is turned on, resulting in the diode having a leakage current during the power switch being turned on. As shown in FIG. 1, if the power switch is turned on and the diode blocks the reverse bias, because an impedance of the diode is higher, peaks WP of a voltage VD corresponding to an auxiliary winding of the flyback power converter are attenuated slowly when the power switch is turned off; and as shown in FIG. 2, if the power switch is turned on and the diode cannot block the reverse bias, the diode will have the leakage current, because the impedance of the diode is lower, the peaks WP of the voltage VD are attenuated quickly when the power switch is turned off, wherein IPRI shown in FIGS. 1, 2 represents a current flowing through the power switch.

When the diode has the leakage current during the power switch is turned on, the leakage current may make the temperature of the diode be increased continuously until the diode breaks down. In addition, when the temperature of the diode is increased continuously, the diode can burn down a printed circuit board where the diode is mounted, or can even burn down an adapter which the flyback power converter is applied to.

Therefore, the prior art utilize over-temperature protection to prevent the above mentioned burning-down conditions from occurring, but the over-temperature protection needs to be implemented by an additional circuit, resulting in cost of the adapter being increased. In addition, another prior art utilizes a specific diode to prevent the above mentioned burning-down conditions from occurring, but the specific diode can also make the cost of the adapter be increased. Therefore, the above mentioned solutions are not good choices for a designer of the flyback power converter.

SUMMARY OF THE INVENTION

An embodiment of the present invention provides a controller with leakage current protection of a diode, wherein the diode is applied to a secondary side of the power converter. The controller includes a comparison unit, a reference voltage generation unit, a time out signal generation unit, and a gate signal generation unit. The comparison unit is used for receiving a compensation voltage, and outputting a corresponding selection signal according to the compensation voltage and a threshold. The reference voltage generation unit is used for outputting a corresponding reference voltage range according to the corresponding selection signal. The time out signal generation unit is used for determining a corresponding time out according to the corresponding selection signal, and generating a corresponding time out signal when a voltage corresponding to an auxiliary winding of the power converter has no peak to cross an upper limit of the corresponding reference voltage range during the corresponding time out. The gate signal generation unit is used for entering the leakage current protection or a quasi-resonant mode according to the corresponding time out signal.

Another embodiment of the present invention provides a controller with leakage current protection of a diode, wherein the diode is applied to a secondary side of the power converter. The controller includes a comparison unit, a reference voltage generation unit, a time out signal generation unit, and a gate signal generation unit. The comparison unit is used for receiving a compensation voltage, and outputting a corresponding selection signal according to the compensation voltage and a threshold. The reference voltage generation unit is used for outputting a first reference voltage range according to first a plurality of peaks of a voltage corresponding to an auxiliary winding of the power converter, and outputting a second reference voltage range after first the plurality of peaks. The time out signal generation unit is used for determining a corresponding time out according to the corresponding selection signal, and generating a corresponding time out signal when the voltage corresponding to the auxiliary winding of the power converter has no peak to cross an upper limit of the first reference voltage range and an upper limit of the second reference voltage range, or to cross the upper limit of the second reference voltage range during the corresponding time out, wherein the upper limit of the first reference voltage range is greater than the upper limit of the second reference voltage range. The gate signal generation unit is used for entering the leakage current protection or a quasi-resonant mode according to the corresponding time out signal.

Another embodiment of the present invention provides an operation method of a controller, wherein the controller has leakage current protection of a diode, the diode is applied to a secondary side of a power converter, and the controller includes a comparison unit, a reference voltage generation unit, a time out signal generation unit, and a gate signal generation unit. The operation method includes the comparison unit receiving a compensation voltage; the comparison unit outputting a corresponding selection signal according to the compensation voltage and a threshold; the reference voltage generation unit outputting a corresponding reference voltage range according to the corresponding selection signal; the time out signal generation unit determining a corresponding time out according to the corresponding selection signal; the time out signal generation unit generating a corresponding time out signal when a voltage corresponding to an auxiliary winding of the power converter has no peak to cross an upper limit of the corresponding reference voltage range during the corresponding time out; and the gate signal generation unit entering the leakage current protection or a quasi-resonant mode according to the corresponding time out signal.

Another embodiment of the present invention provides an operation method of a controller, wherein the controller has leakage current protection of a diode, the diode is applied to a secondary side of a power converter, and the controller includes a comparison unit, a reference voltage generation unit, a time out signal generation unit, and a gate signal generation unit. The operation method includes the comparison unit receiving a compensation voltage; the reference voltage generation unit outputting a first reference voltage range according to first a plurality of peaks of a voltage corresponding to an auxiliary winding of the power converter, and outputting a second reference voltage range after first the plurality of peaks; the comparison unit outputting a corresponding selection signal according to the compensation voltage and a threshold; the time out signal generation unit determining a corresponding time out according to the corresponding selection signal; the time out signal generation unit generating a corresponding time out signal when the voltage corresponding to the auxiliary winding of the power converter has no peak to cross an upper limit of the first reference voltage range and an upper limit of the second reference voltage range, or to cross the upper limit of the second reference voltage range during the corresponding time out, wherein the upper limit of the first reference voltage range is greater than the upper limit of the second reference voltage range; and the gate signal generation unit entering the leakage current protection or a quasi-resonant mode according to the corresponding time out signal.

The present invention provides a controller with leakage current protection of a diode and an operation method thereof. The controller and the operation method utilize a comparison unit to output a corresponding selection signal according to a compensation voltage and a threshold, utilize a reference voltage generation unit to output a corresponding reference voltage range according to the corresponding selection signal or peaks of a voltage corresponding to an auxiliary winding of a power converter, utilize a time out signal generation unit to determine a corresponding time out according to the corresponding selection signal, and to generate a corresponding time out signal according to the voltage corresponding to the auxiliary winding of the power converter and an upper limit of the corresponding reference voltage range during the corresponding time out, and utilize a gate signal generation unit to enter leakage current protection or a quasi-resonant mode according to the corresponding time out signal. Therefore, compared to the prior art, because the present invention can operate only according to the compensation voltage, the threshold, and the voltage corresponding to the auxiliary winding of the power converter, the present invention not only can have lower cost, but can also quickly enter the leakage current protection when the diode has a leakage current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
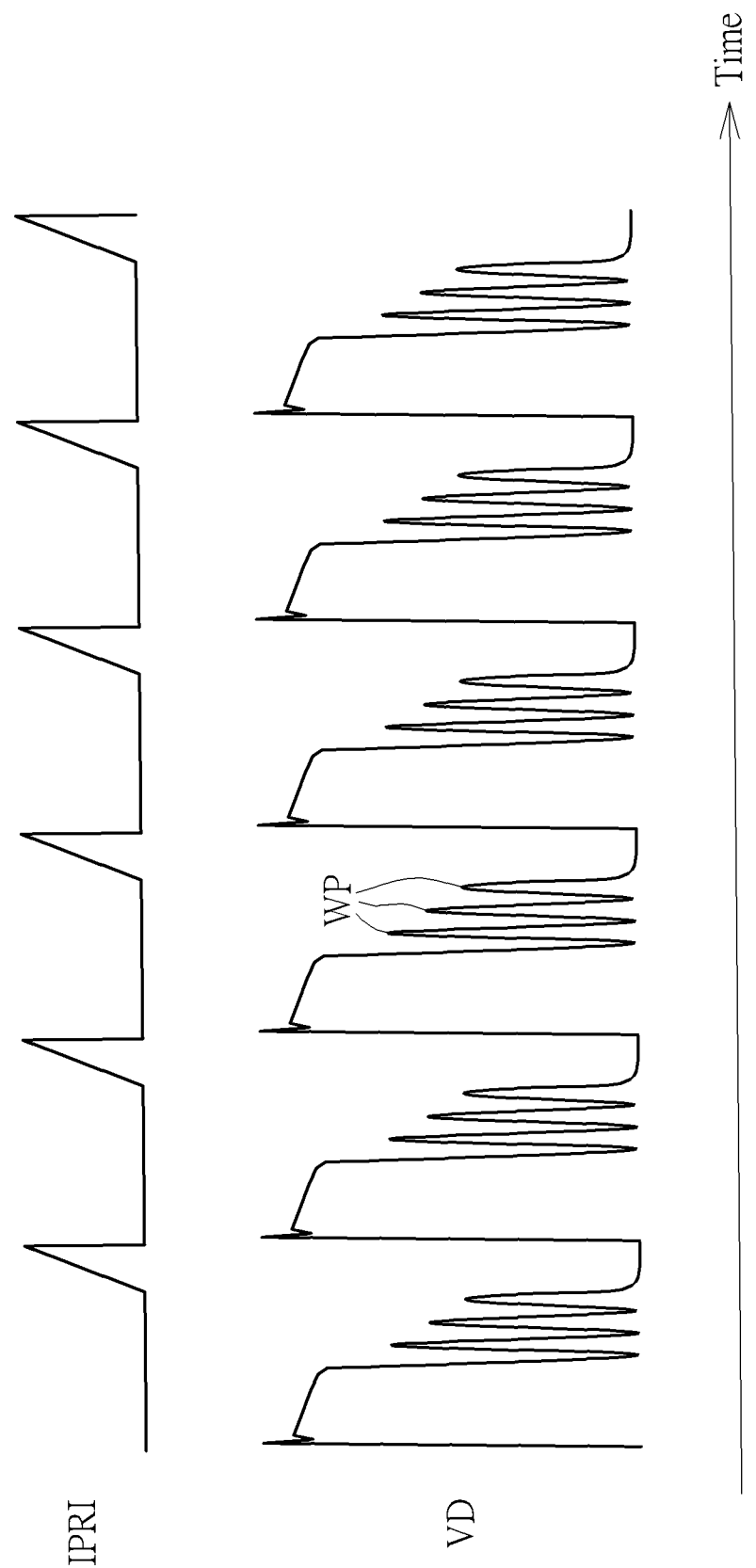
FIG. 1 is a diagram illustrating if the power switch is turned on and the diode blocks the reverse bias, peaks of a voltage corresponding to an auxiliary winding of the flyback power converter being attenuated slowly when the power switch is turned off.
Figure 2:
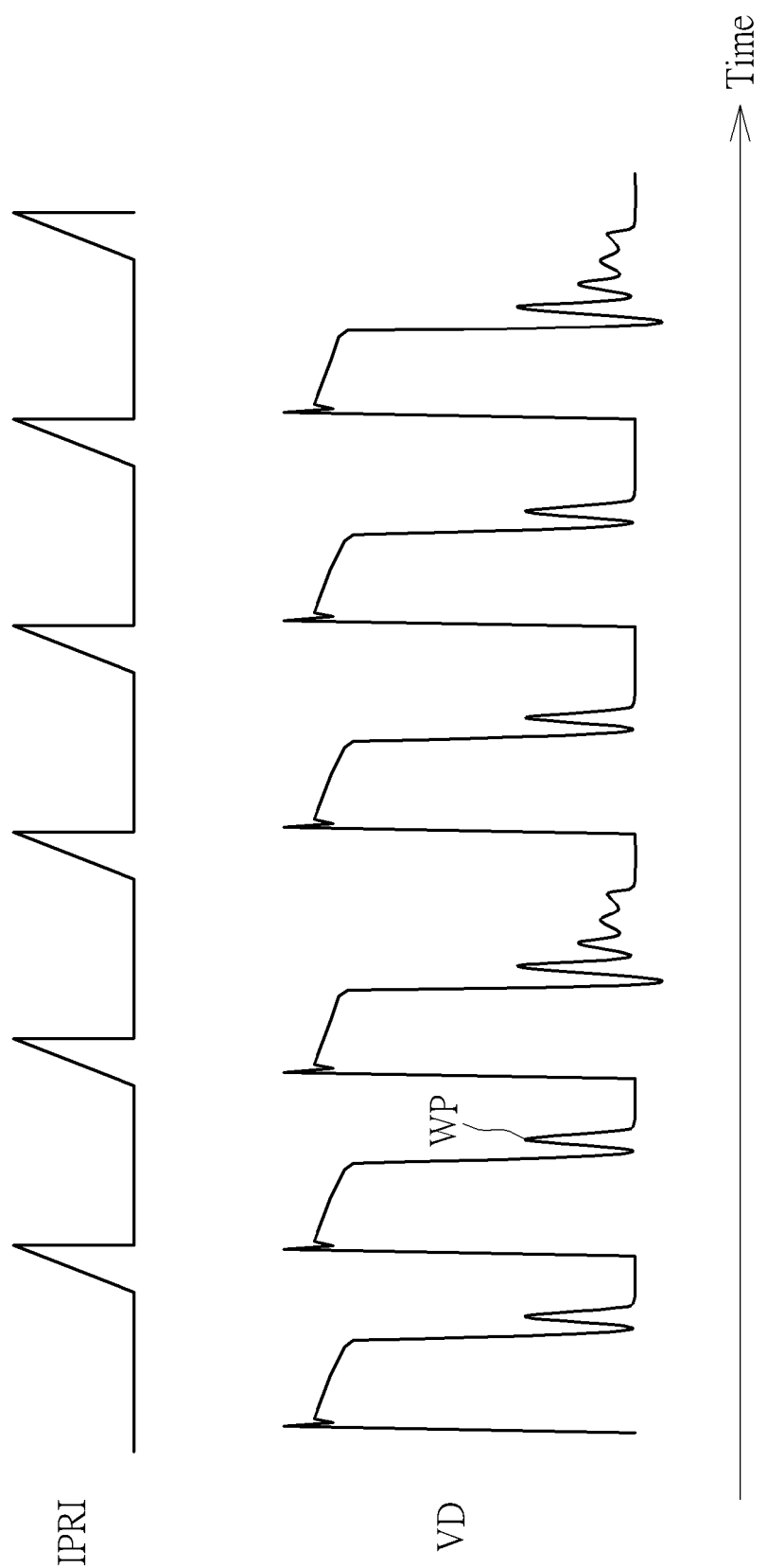
FIG. 2 is a diagram illustrating if the power switch is turned on and the diode cannot block the reverse bias, the peaks of the voltage corresponding to the auxiliary winding of the flyback power converter being attenuated quickly when the power switch is turned off.
Figure 3:
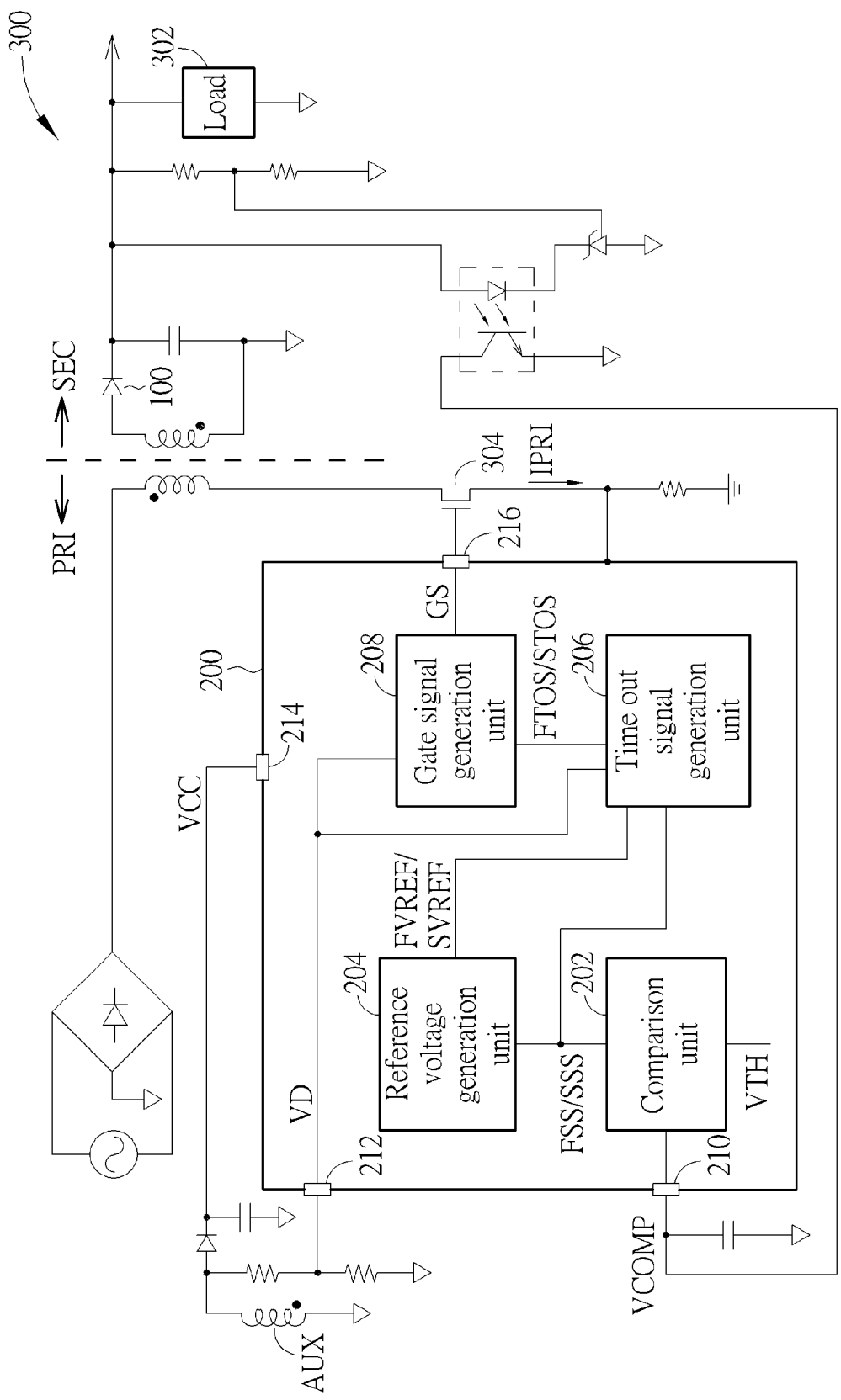
FIG. 3 is a diagram illustrating a controller with leakage current protection of a diode according to a first embodiment of the present invention.
Figure 4A:
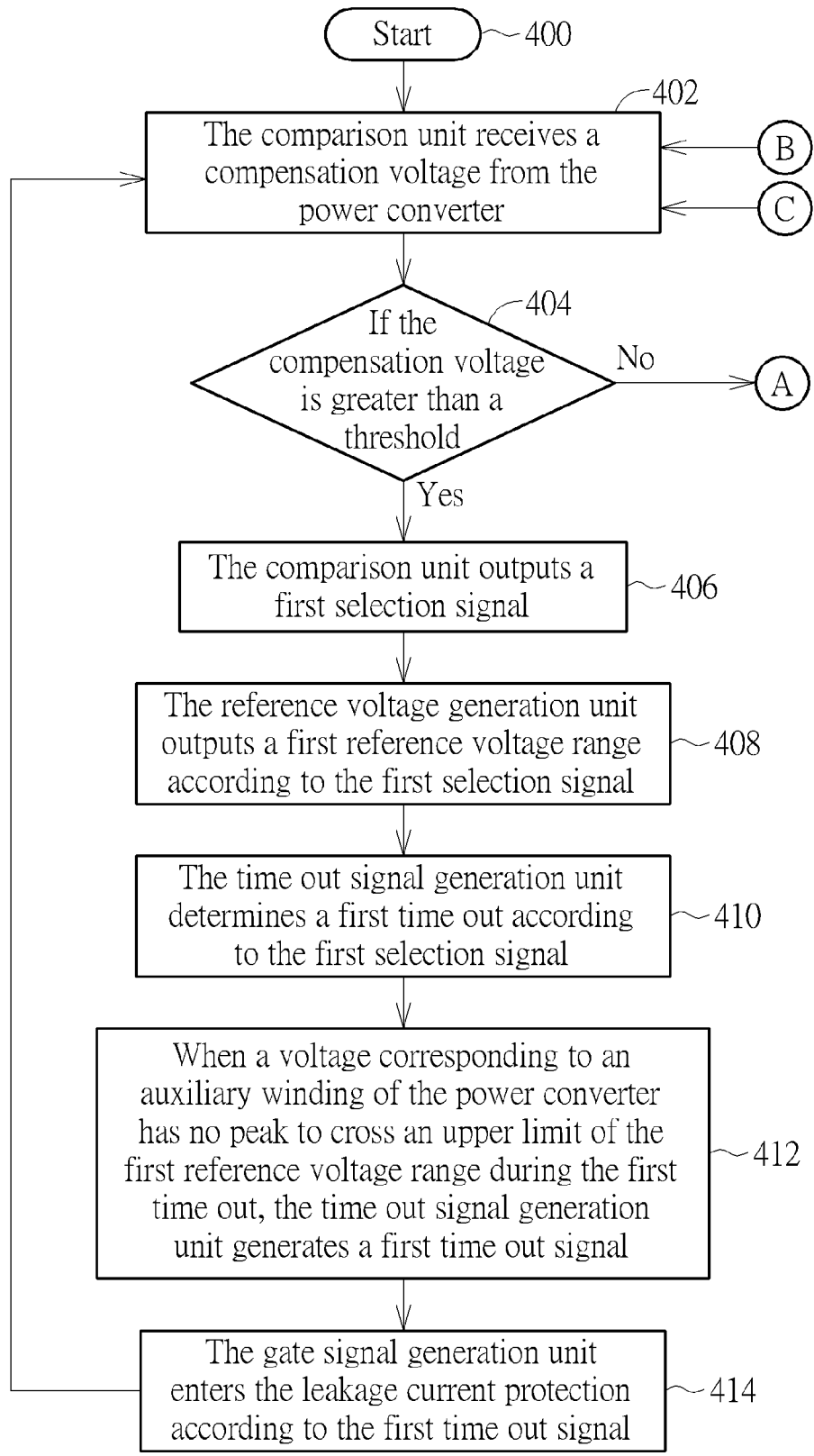
FIGS. 4A, 4B are flowcharts illustrating an operation method of a controller according to a second embodiment of the present invention.
Figure 4B:
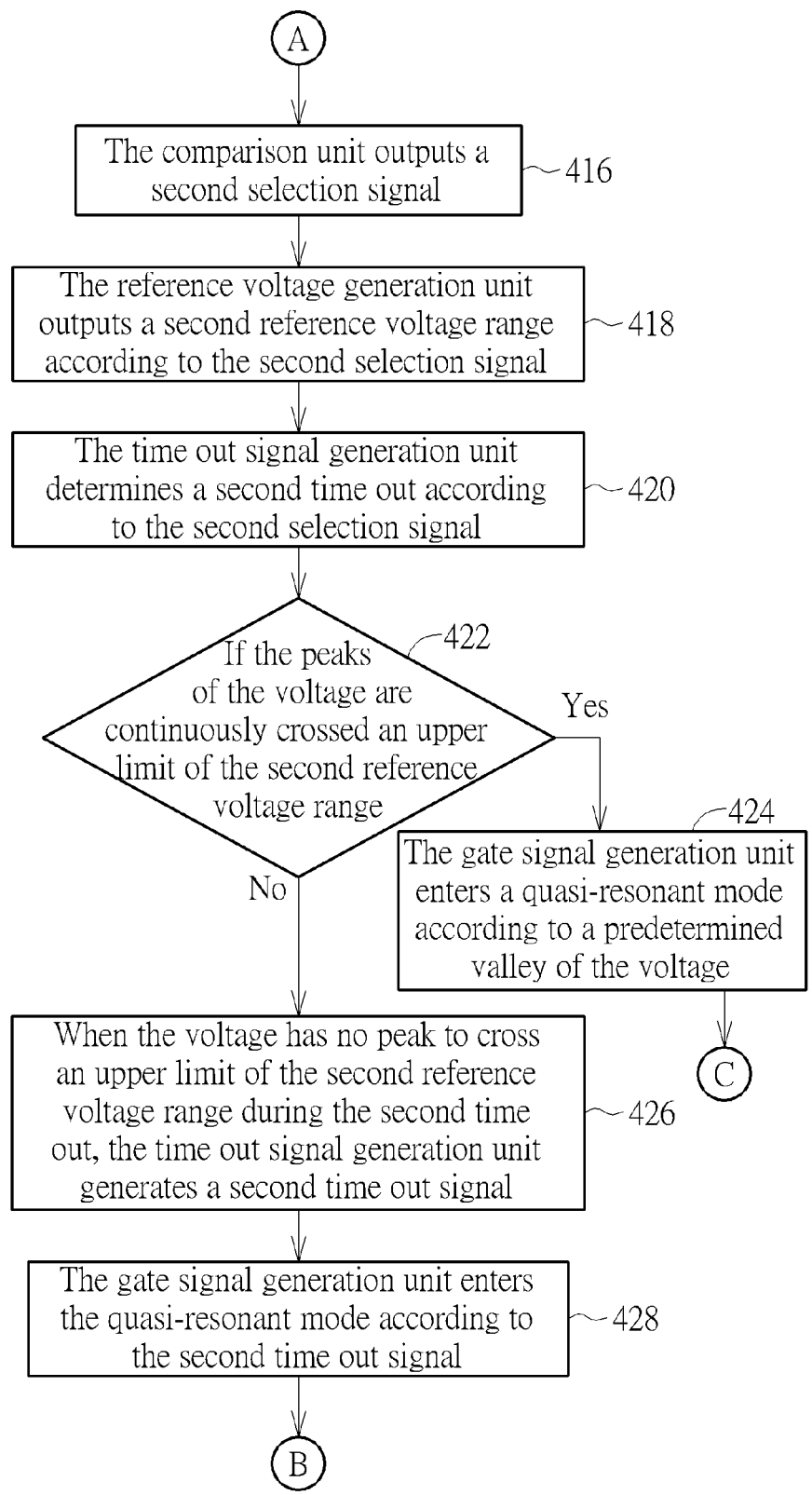

Please refer to FIG. 3. FIG. 3 is a diagram illustrating a controller 200 with leakage current protection of a diode 100 according to a first embodiment of the present invention, wherein the diode 100 is applied to a secondary side SEC of a power converter 300, and the controller 200 is applied to a primary side PRI of the power converter 300. As shown in FIG. 3, the controller 200 includes a comparison unit 202, a reference voltage generation unit 204, a time out signal generation unit 206, and a gate signal generation unit 208, wherein the reference voltage generation unit 204 is coupled to the comparison unit 202, and the time out signal generation unit 206 is coupled to the comparison unit 202, the reference voltage generation unit 204, and the gate signal generation unit 208. Please refer to FIGS. 3, 4A, 4B. FIGS. 4A, 4B are flowcharts illustrating an operation method of a controller according to a second embodiment of the present invention. The operation method in FIGS. 4A, 4B is illustrated using the diode 100, the controller 200, and the power converter 300 in FIG. 3. Detailed steps are as follows:

Step 400: Start.

Step 402: The comparison unit 202 receives a compensation voltage VCOMP from the power converter 300.

Step 404: If the compensation voltage VCOMP is greater than a threshold VTH; if yes, go to Step 406; if no, go to Step 416.

Step 406: The comparison unit 202 outputs a first selection signal FSS.

Step 408: The reference voltage generation unit 204 outputs a first reference voltage range FVREF according to the first selection signal FSS.

Step 410: The time out signal generation unit 206 determines a first time out FTO according to the first selection signal FSS.

Step 412: When a voltage VD corresponding to an auxiliary winding AUX of the power converter 300 has no peak WP to cross an upper limit FUPL of the first reference voltage range FVREF during the first time out FTO, the time out signal generation unit 206 generates a first time out signal FTOS.

Step 414: The gate signal generation unit 208 enters the leakage current protection according to the first time out signal FTOS, go to Step 402.

Step 416: The comparison unit 202 outputs a second selection signal SSS.

Step 418: The reference voltage generation unit 204 outputs a second reference voltage range SVREF according to the second selection signal SSS.

Step 420: The time out signal generation unit 206 determines a second time out STO according to the second selection signal SSS.

Step 422: If the peaks WP of the voltage VD are continuously crossed an upper limit SUPL of the second reference voltage range SVREF; if yes, go to Step 424; if no, go to Step 426.

Step 424: The gate signal generation unit 208 enters a quasi-resonant mode according to a predetermined valley PVA of the voltage VD, go to Step 402.

Step 426: When the voltage VD has no peak to cross an upper limit SUPL of the second reference voltage range SVREF during the second time out STO, the time out signal generation unit 206 generates a second time out signal STOS.

Step 428: The gate signal generation unit 208 enters the quasi-resonant mode according to the second time out signal STOS, go to Step 402.

Figure 5:
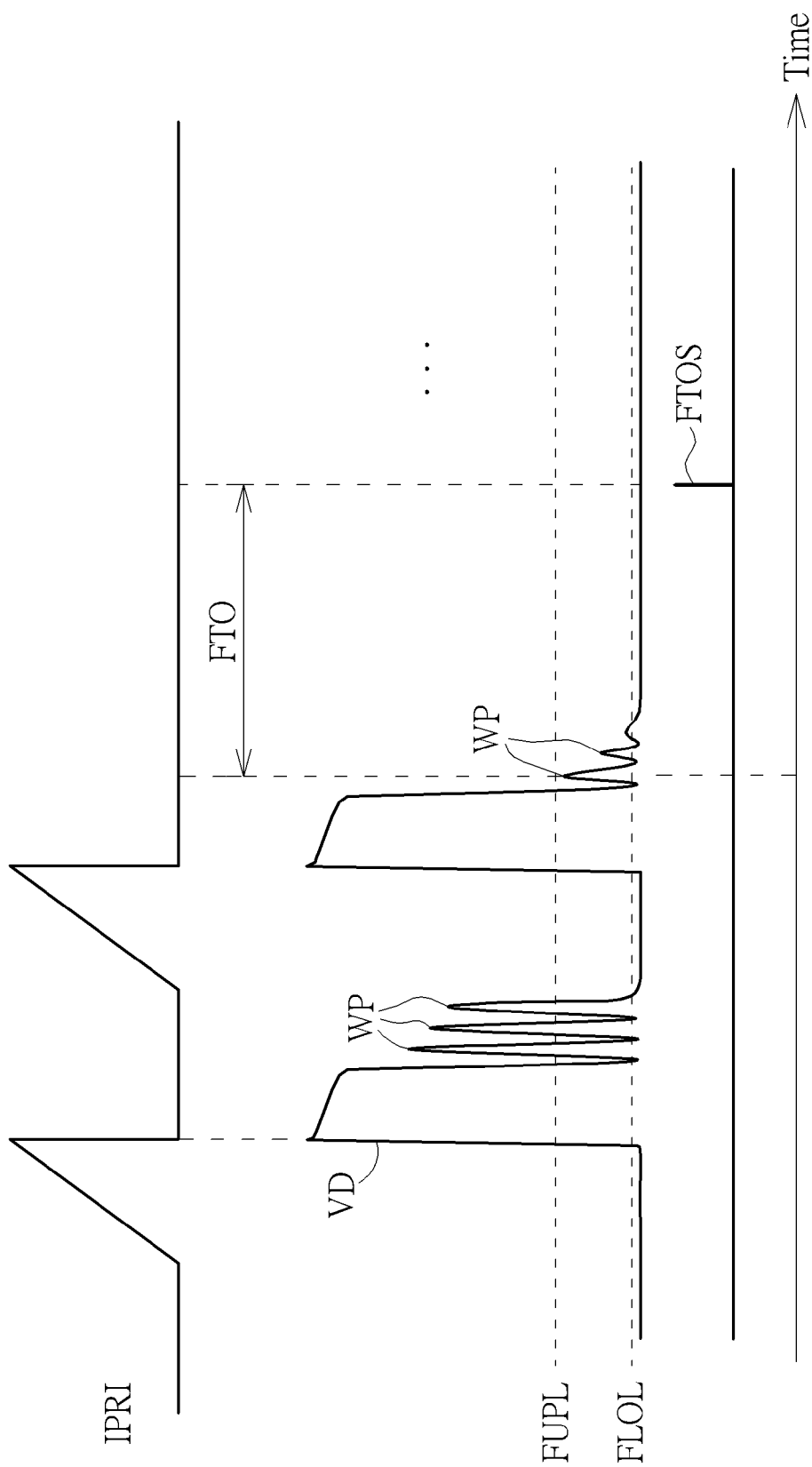
FIG. 5 is a diagram illustrating relationships between the first time out signal, the peaks of the voltage corresponding to the auxiliary winding of the power converter, the first time out, the current flowing through the power switch, and the upper limit and the lower limit of the first reference voltage range when the diode has the leakage current.

In Step 402, the comparison unit 202 receives the compensation voltage VCOMP from the secondary side SEC of the power converter 300 through a compensation pin 210, wherein the compensation voltage VCOMP corresponds to a load 302 coupled to the secondary side SEC of the power converter 300. But, in another embodiment of the present invention, the compensation voltage VCOMP can also be provided by a signal from the primary side PRI of the power converter 300 corresponding to the load 302. In Step 406, when the compensation voltage VCOMP is greater than the threshold VTH (that is, the load 302 is heavy), the first selection signal FSS outputted by the comparison unit 202 is logic-high. But, the present invention is not limited to the first selection signal FSS outputted by the comparison unit 202 being logic-high when the compensation voltage VCOMP is greater than the threshold VTH. In Step 408, the reference voltage generation unit 204 can output the first reference voltage range FVREF (e.g. 0.1V-0.8V) according to the first selection signal FSS. But, the present invention is not limited to the first reference voltage range FVREF being between 0.1V-0.8V. In Step 412, the time out signal generation unit 206 receives the voltage VD through a feedback pin 212. As shown in FIG. 5, if the diode 100 cannot block a reverse bias crossed on the diode 100 during a power switch 304 of the primary side PRI of the power converter 300 being turned on, the diode 100 has a leakage current, so when the power switch 304 is turned off, because an impedance of the diode 100 is smaller (because the diode 100 has the leakage current), the peaks WP of the voltage VD are attenuated more quickly. As shown in FIG. 5, because the first reference voltage range FVREF has the higher upper limit FUPL (e.g. 0.8V) and the peaks WP of the voltage VD are attenuated more quickly, the time out signal generation unit 206 generates the first time out signal FTOS when the voltage VD has no peak to cross the upper limit FUPL of the first reference voltage range FVREF during the first time out FTO. In Step 414, after the gate signal generation unit 208 receives the first time out signal FTOS, the gate signal generation unit 208 enters the leakage current protection according to the first time out signal FTOS. That is to say, the gate signal generation unit 208 does not generate a gate signal GS corresponding to the quasi-resonant mode to the power switch 304 according to the first time out signal FTOS until the controller 200 is shut down. That is to say, because the gate signal generation unit 208 does not generate the gate signal GS corresponding to the quasi-resonant mode to the power switch 304, a voltage VCC generated from the auxiliary winding AUX for supplying the controller 200 is decreased continuously until the controller 200 is shut down, wherein FLOL shown in FIG. 5 represents a lower limit of the first reference voltage range FVREF. Further, as shown in FIG. 3, the controller 200 receives the voltage VCC through a high voltage pin 214. In addition, because the controller 200 is shut down, the power converter 300 cannot operate, resulting in a temperature of the diode 100 being decreased immediately. In addition, in another embodiment of the present invention, when the voltage VD has no peak WP to cross the upper limit FUPL of the first reference voltage range FVREF during the first time out FTO, the gate signal generation unit 208 can generate the gate signal GS corresponding to a hiccup mode to the power switch 304 according to the first time out signal FTOS, wherein the gate signal GS is transmitted to the power switch 304 through a gate pin 216. Meanwhile, because the power converter 300 operates in the hiccup mode, the temperature of the diode 100 can also be decreased immediately.

Figure 6:
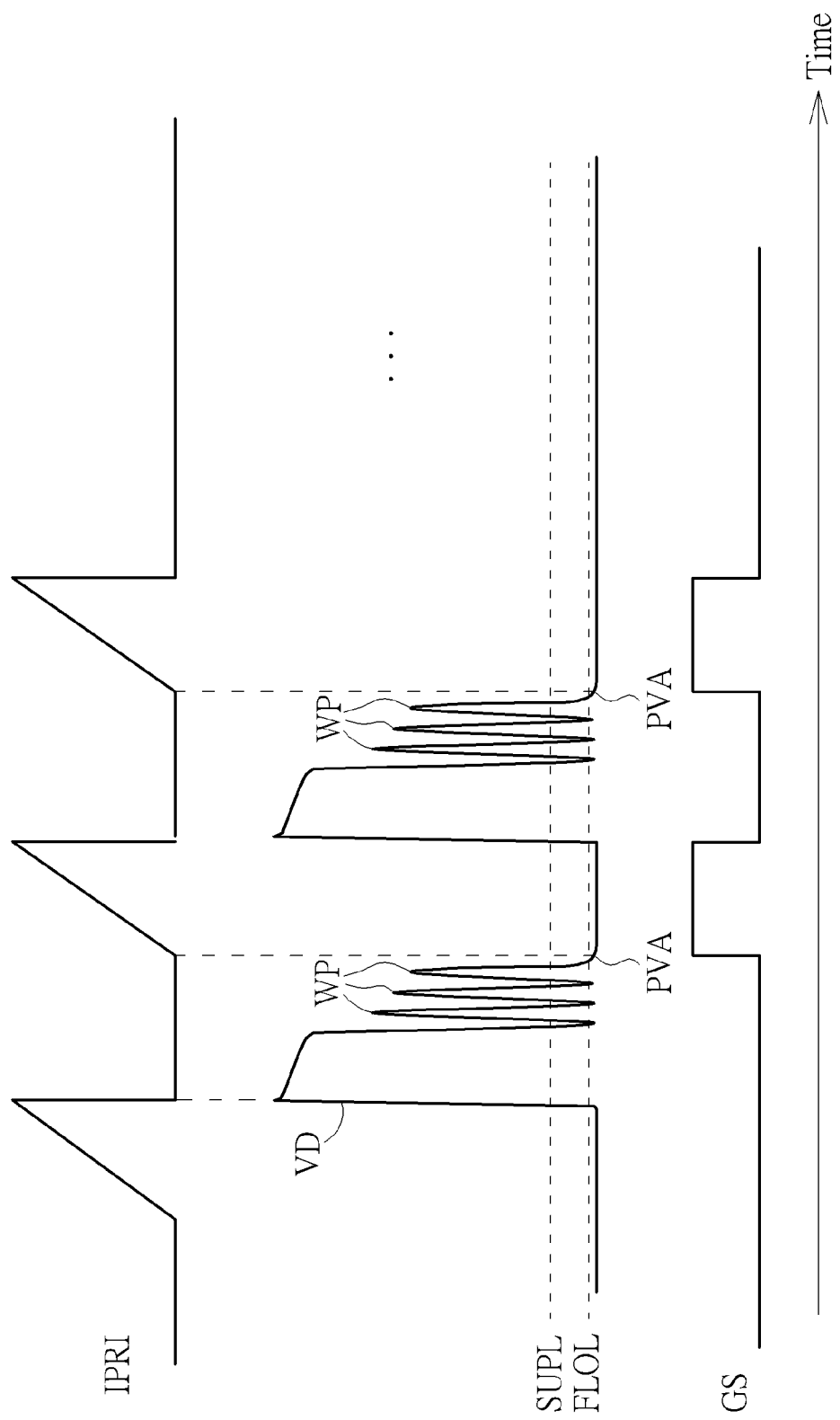
FIG. 6 is a diagram illustrating relationships between the peaks of the voltage corresponding to the auxiliary winding of the power converter, the gate signal, the current flowing through the power switch, and the upper limit and the lower limit of the second reference voltage range when the diode does not have the leakage current.

In addition, in Step 416, when the compensation voltage VCOMP is less than the threshold VTH (that is, the load 302 is medium or light), the second selection signal SSS outputted by the comparison unit 202 is logic-low. But, the present invention is not limited to the second selection signal SSS outputted by the comparison unit 202 being logic-low when the compensation voltage VCOMP is less than the threshold VTH. In Step 418, the reference voltage generation unit 204 can output the second reference voltage range SVREF (e.g. 0.1V-0.4V) according to the second selection signal SSS, wherein the upper limit SUPL of the second reference voltage range SVREF is less than the upper limit FUPL of the first reference voltage range FVREF, and the present invention is not limited to the second reference voltage range SVREF being between 0.1V-0.4V. In Step 420, because the load 302 is medium or light, the temperature of the diode 100 is not too high. Because the temperature of the diode 100 is not too high, the diode 100 does not have the leakage current. Thus, the second time out STO needs to be less than the first time out FTO to prevent the controller 200 from being shut down. In Step 424, as shown in FIG. 6, because the peaks WP of the voltage VD are continuously crossed the upper limit SUPL of the second reference voltage range SVREF, the gate signal generation unit 208 can enter the quasi-resonant mode according to the predetermined valley PVA of the voltage VD (e.g. a fourth valley of the voltage VD), that is, the gate signal generation unit 208 generates the gate signal GS corresponding to the quasi-resonant mode to the power switch 304 according to the predetermined valley PVA of the voltage VD to make the power converter 300 operate in the quasi-resonant mode, wherein any valley of the voltage VD is lower than the lower limit FLOL of the first reference voltage range FVREF and a lower limit SLOL of the second reference voltage range SVREF. In addition, the present invention is not limited to the gate signal generation unit 208 entering the quasi-resonant mode according to the fourth valley of the voltage VD.

Figure 7:
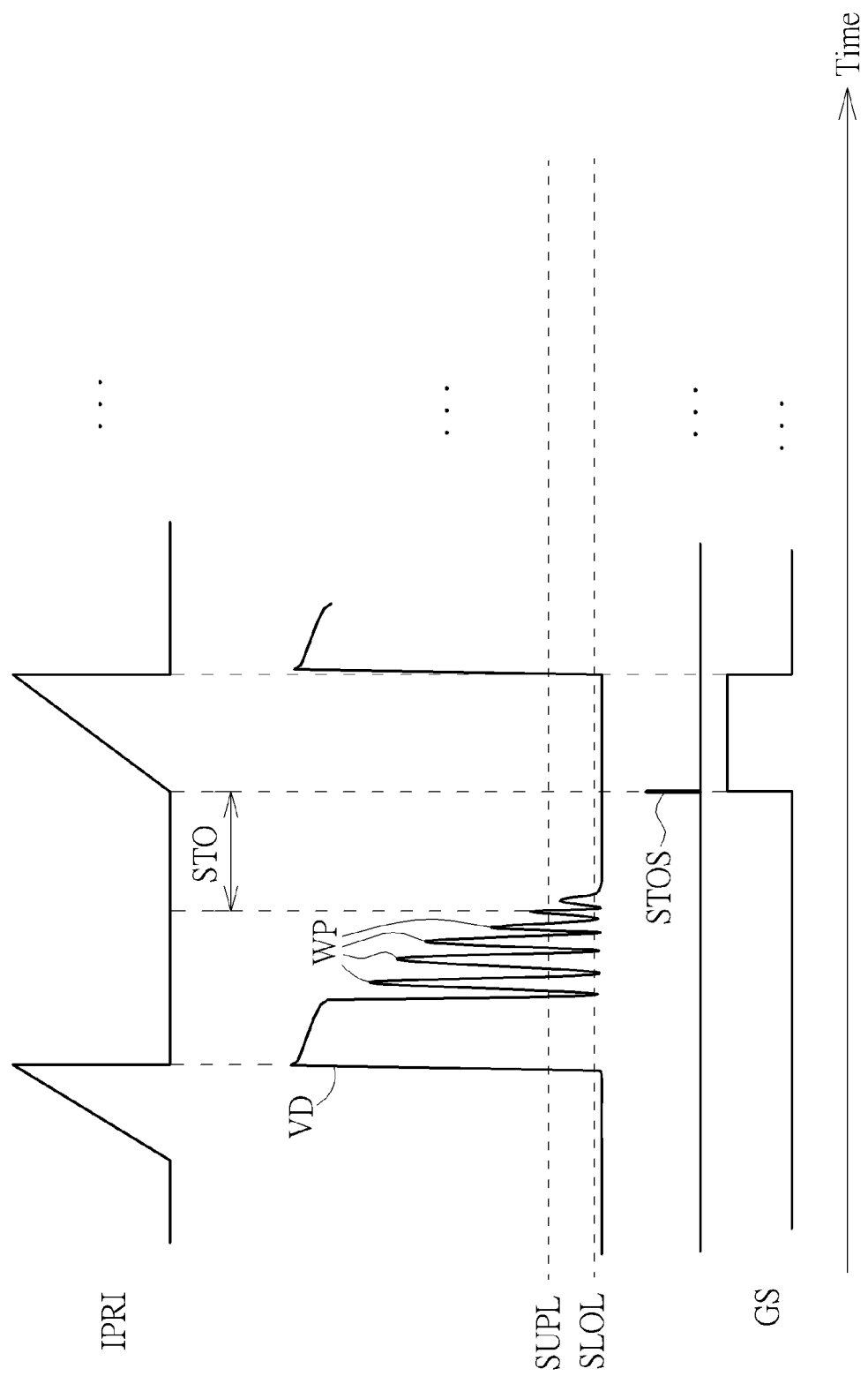
FIG. 7 is a diagram illustrating relationships between the second time out signal, the peaks of the voltage corresponding to the auxiliary winding of the power converter, the second time out, the gate signal, the current flowing through the power switch, and the upper limit and the lower limit of the second reference voltage range when the diode does not have the leakage current.

In addition, as shown in FIG. 7, in Step 426, when the voltage VD has no peak WP to cross the upper limit SUPL of the second reference voltage range SVREF during the second time out STO, the time out signal generation unit 206 generates the second time out signal STOS. In Step 428, after the gate signal generation unit 208 receives the second time out signal STOS, the gate signal generation unit 208 enters the quasi-resonant mode according to the second time out signal STOS. That is to say, the gate signal generation unit 208 generates the gate signal GS corresponding to the quasi-resonant mode to the power switch 304 according to the second time out signal STOS to make the power converter 300 operate in the quasi-resonant mode.

Figure 8:
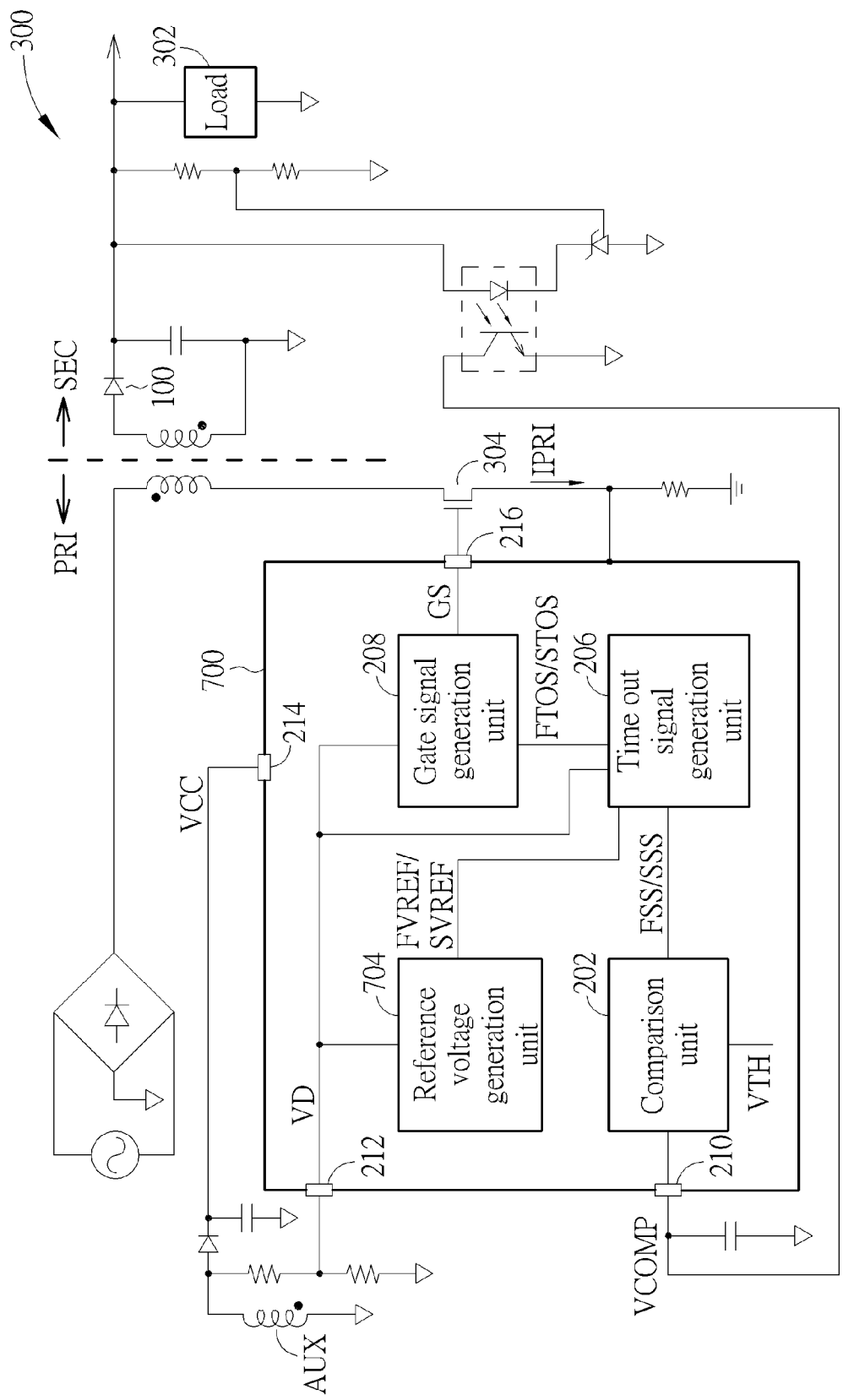
FIG. 8 is a diagram illustrating a controller with the leakage current protection of the diode according to a third embodiment of the present invention.
Figure 9A:
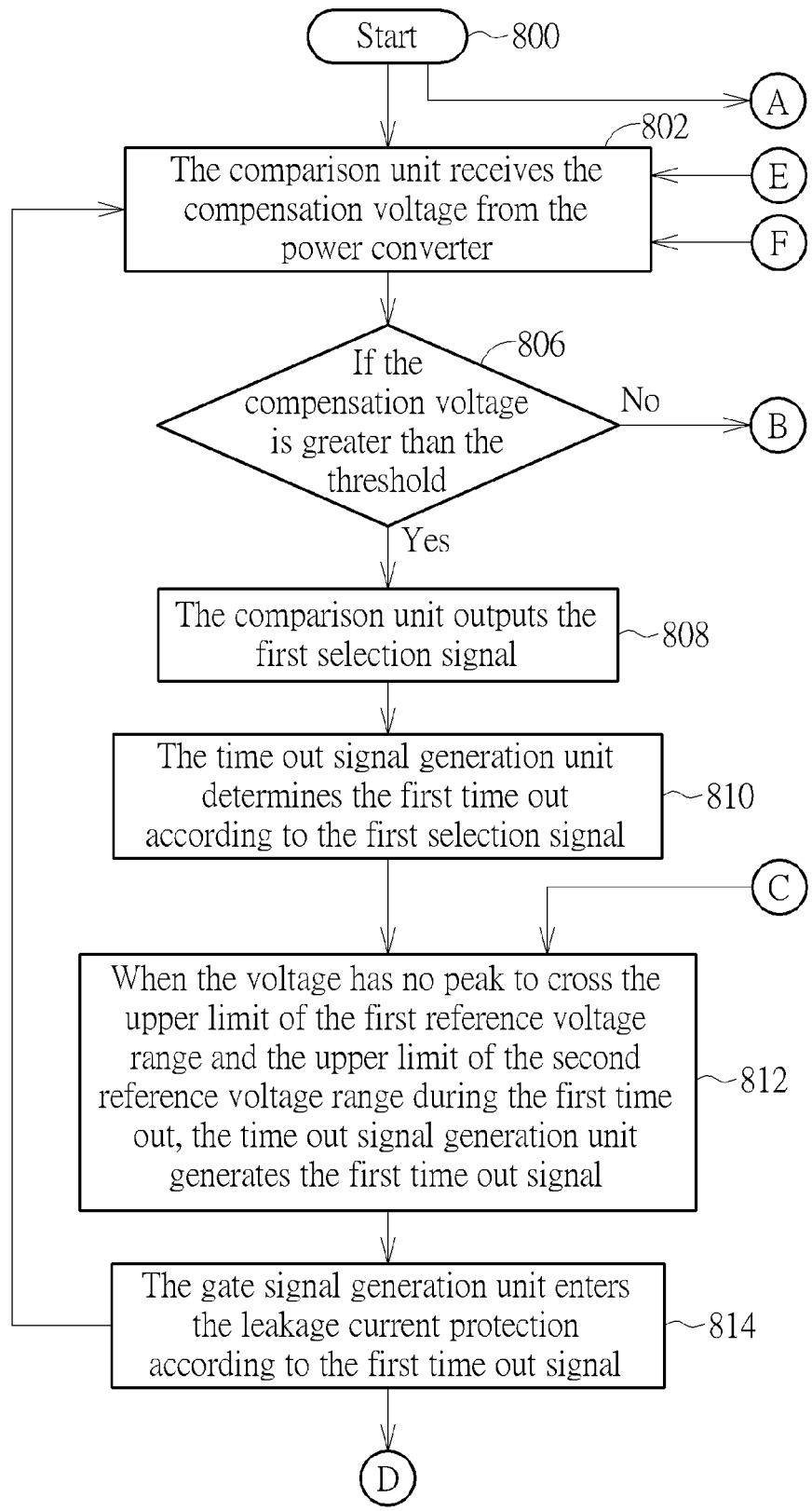
FIGS. 9A, 9B are flowcharts illustrating an operation method of a controller according to a fourth embodiment of the present invention.
Figure 9B:
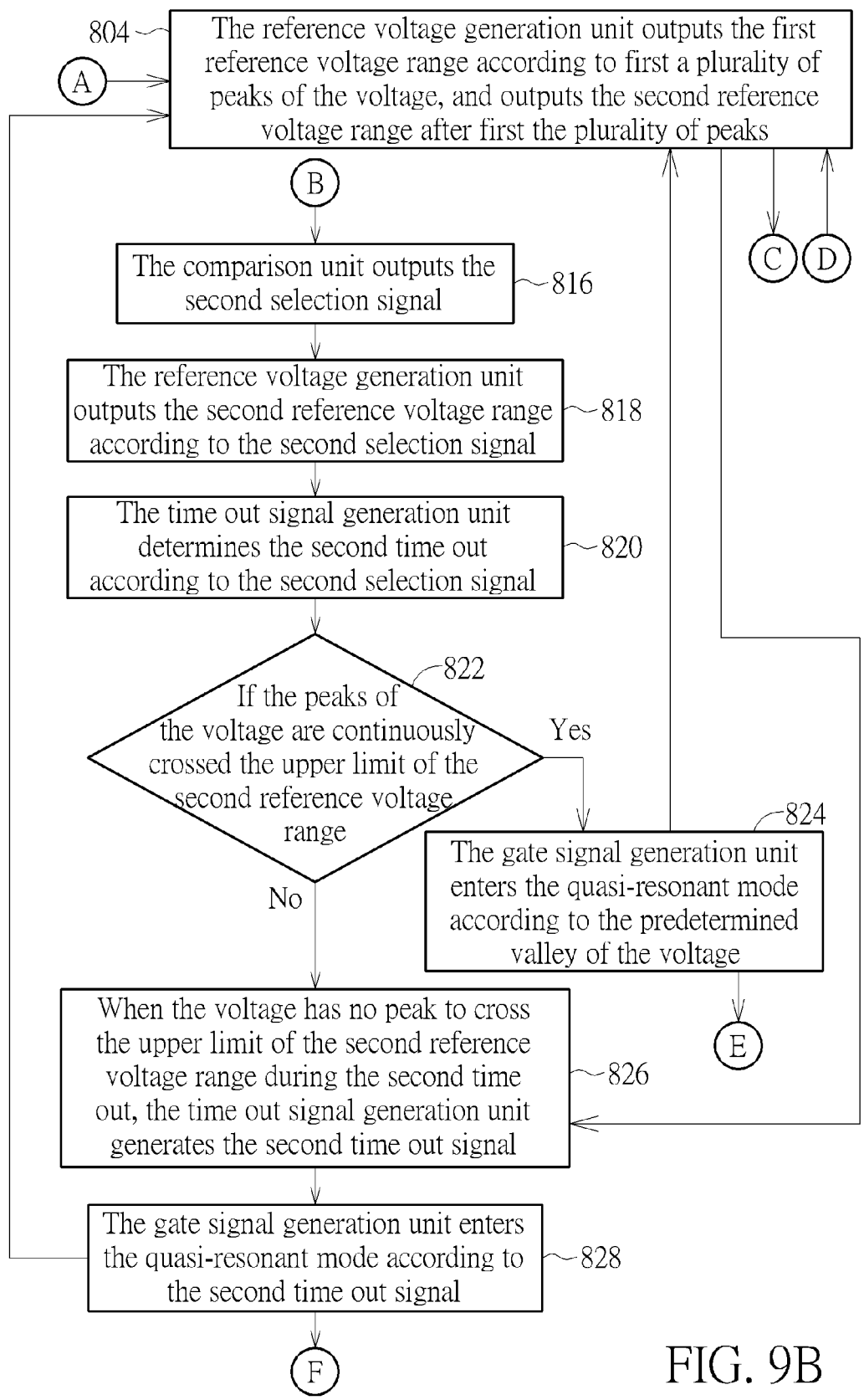

Please refer to FIG. 8. FIG. 8 is a diagram illustrating a controller 700 with the leakage current protection of the diode 100 according to a third embodiment of the present invention, wherein the diode 100 is applied to the secondary side SEC of the power converter 300, and the controller 700 is applied to the primary side PRI of the power converter 300. As shown in FIG. 8, the controller 700 includes the comparison unit 202, a reference voltage generation unit 704, the time out signal generation unit 206, and the gate signal generation unit 208, wherein the reference voltage generation unit 704 is coupled to the feedback pin 212, and the time out signal generation unit 206 is coupled to the comparison unit 202, the reference voltage generation unit 704, and the gate signal generation unit 208. Please refer to FIGS. 8, 9A, 9B. FIGS. 9A, 9B are flowcharts illustrating an operation method of a controller according to a fourth embodiment of the present invention. The operation method in FIGS. 9A, 9B is illustrated using the diode 100, the controller 700, and the power converter 300 in FIG. 8. Detailed steps are as follows:

Step 800: Start.

Step 802: The comparison unit 202 receives the compensation voltage VCOMP from the power converter 300.

Step 804: The reference voltage generation unit 704 outputs the first reference voltage range FVREF according to first a plurality of peaks WP of the voltage VD, and outputs the second reference voltage range SVREF after first the plurality of peaks WP.

Step 806: If the compensation voltage VCOMP is greater than the threshold VTH; if yes, go to Step 808; if no, go to Step 816.

Step 808: The comparison unit 202 outputs the first selection signal FSS.

Step 810: The time out signal generation unit 206 determines the first time out FTO according to the first selection signal FSS.

Step 812: When the voltage VD has no peak WP to cross the upper limit FUPL of the first reference voltage range FVREF and the upper limit SUPL of the second reference voltage range SVREF during the first time out FTO, the time out signal generation unit 206 generates the first time out signal FTOS.

Step 814: The gate signal generation unit 208 enters the leakage current protection according to the first time out signal FTOS, go to Step 802 and Step 804.

Step 816: The comparison unit 202 outputs the second selection signal SSS.

Step 818: The reference voltage generation unit 704 outputs the second reference voltage range SVREF according to the second selection signal SSS.

Step 820: The time out signal generation unit 206 determines the second time out STO according to the second selection signal SSS.

Step 822: If the peaks WP of the voltage VD are continuously crossed the upper limit SUPL of the second reference voltage range SVREF; if yes, go to Step 824; if no, go to Step 826.

Step 824: The gate signal generation unit 208 enters the quasi-resonant mode according to the predetermined valley PVA of the voltage VD, go to Step 802 and Step 804.

Step 826: When the voltage VD has no peak WP to cross the upper limit SUPL of the second reference voltage range SVREF during the second time out STO, the time out signal generation unit 206 generates the second time out signal STOS.

Step 828: The gate signal generation unit 208 enters the quasi-resonant mode according to the second time out signal STOS, go to Step 802 and Step 804.

Figure 10:
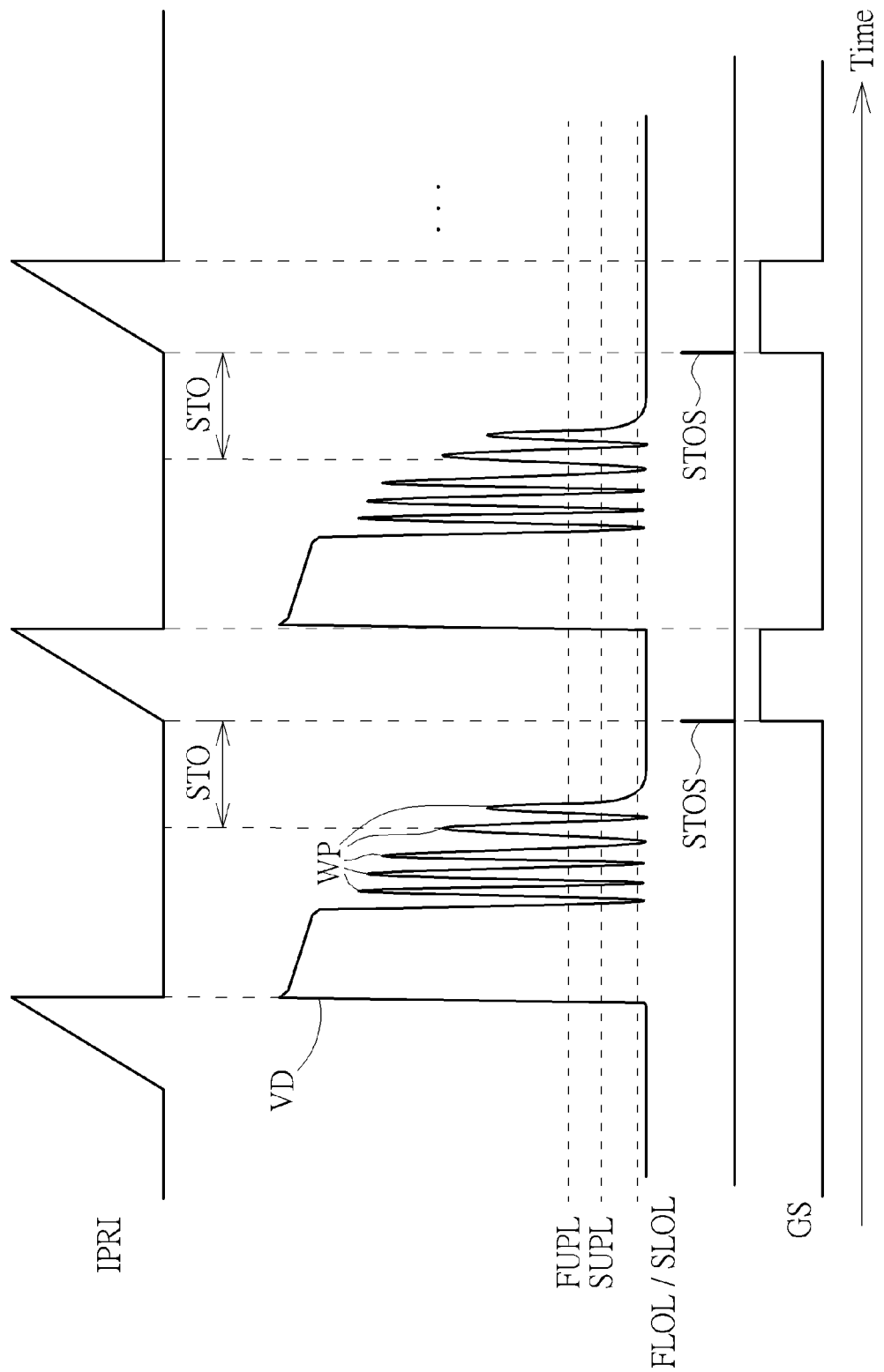
FIG. 10 is a diagram illustrating relationships between the peaks of the voltage corresponding to the auxiliary winding of the power converter, the current flowing through the power switch, the upper limit and the lower limit of the first reference voltage range, and the upper limit and the lower limit of the second reference voltage range.

Differences between the embodiment in FIGS. 9A, 9B and the embodiment in FIGS. 4A, 4B are that in Step 804, the reference voltage generation unit 704 can output the first reference voltage range FVREF according to first the plurality of peaks WP of the voltage VD (e.g. first three peaks WP of the voltage VD), and output the second reference voltage range SVREF after the first three peaks WP of the voltage VD (as shown in FIG. 10), but the present invention is not limited to the reference voltage generation unit 704 outputting the first reference voltage range FVREF according to the first three peaks WP of the voltage VD, and outputting the second reference voltage range SVREF after the first three peaks WP of the voltage VD; in Step 812, when the voltage VD has no peak WP to cross the upper limit FUPL of the first reference voltage range FVREF and the upper limit SUPL of the second reference voltage range SVREF during the first time out FTO, the time out signal generation unit 206 generates the first time out signal FTOS; in Step 826, when the voltage VD has no peak WP to cross the upper limit SUPL of the second reference voltage range SVREF during the second time out STO, the time out signal generation unit 206 generates the second time out signal STOS. As shown in FIG. 10, because the upper limit FUPL of the first reference voltage range FVREF is greater than the upper limit SUPL of the second reference voltage range SVREF, the embodiment in FIGS. 9A, 9B not only can prevent the time out signal generation unit 206 from generating the first time out signal FTOS to make the gate signal generation unit 208 enter the leakage current protection according to the first time out signal FTOS when the load 302 is medium, but can also make the gate signal generation unit 208 quickly enter the leakage current protection according to the first time out signal FTOS when the load 302 is heavy. In addition, subsequent operational principles of the embodiment in FIGS. 9A, 9B are the same as those of the embodiment in FIGS. 4A, 4B, so further description thereof is omitted for simplicity.

To sum up, the controller with leakage current protection of the diode and the operation method thereof utilize the comparison unit to output the corresponding selection signal according to the compensation voltage and the threshold, utilize the reference voltage generation unit to output the corresponding reference voltage range according to the corresponding selection signal or the peaks of the voltage corresponding to the auxiliary winding of the power converter, utilize the time out signal generation unit to determine the corresponding time out according to the corresponding selection signal, and to generate the corresponding time out signal according to the voltage corresponding to the auxiliary winding of the power converter and the upper limit of the corresponding reference voltage range during the corresponding time out, and utilize the gate signal generation unit to enter the leakage current protection or the quasi-resonant mode according to the corresponding time out signal. Therefore, compared to the prior art, because the present invention can operate only according to the compensation voltage, the threshold, and the voltage corresponding to the auxiliary winding of the power converter, the present invention not only can have lower cost, but can also quickly enter the leakage current protection when the diode has the leakage current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller with leakage current protection of a diode, wherein the diode is applied to a secondary side of a power converter, the controller comprising:
   a comparison unit for receiving a compensation voltage, and outputting a corresponding selection signal according to the compensation voltage and a threshold;
   a reference voltage generation unit for outputting a corresponding reference voltage range according to the corresponding selection signal;
   a time out signal generation unit for determining a corresponding time out according to the corresponding selection signal, and generating a corresponding time out signal when a voltage corresponding to an auxiliary winding of the power converter has no peak to cross an upper limit of the corresponding reference voltage range during the corresponding time out; and
   a gate signal generation unit for entering the leakage current protection or a quasi-resonant mode according to the corresponding time out signal.

2. The controller claim 1, wherein the gate signal generation unit entering the leakage current protection according to the corresponding time out signal is the gate signal generation unit not generating a gate signal corresponding to the quasi-resonant mode to a power switch of a primary side of the power converter according to the corresponding time out signal when the corresponding time out corresponds to the compensation voltage being greater than the threshold.

3. The controller claim 1, wherein the gate signal generation unit entering the leakage current protection according to the corresponding time out signal is the gate signal generation unit generating a gate signal corresponding to a hiccup mode to a power switch of a primary side of the power converter according to the corresponding time out signal when the corresponding time out corresponds to the compensation voltage being greater than the threshold.

4. The controller claim 1, wherein the gate signal generation unit entering the quasi-resonant mode according to the corresponding time out signal is the gate signal generation unit generating a gate signal corresponding to the quasi-resonant mode to a power switch of a primary side of the power converter according to the corresponding time out signal when the corresponding time out corresponds to the compensation voltage being less than the threshold.

5. The controller claim 1, wherein the compensation voltage corresponds to a load of the secondary side of the power converter.

6. The controller claim 1, wherein when the compensation voltage is less than the threshold and peaks of the voltage corresponding to the auxiliary winding of the power converter are continuously crossed the upper limit of the corresponding reference voltage range, the gate signal generation unit further enters the quasi-resonant mode according to a predetermined valley of the voltage corresponding to the auxiliary winding of the power converter.

7. A controller with leakage current protection of a diode, wherein the diode is applied to a secondary side of a power converter, the controller comprising:
   a comparison unit for receiving a compensation voltage, and outputting a corresponding selection signal according to the compensation voltage and a threshold;
   a reference voltage generation unit for outputting a first reference voltage range according to first a plurality of peaks of a voltage corresponding to an auxiliary winding of the power converter, and outputting a second reference voltage range after first the plurality of peaks;
   a time out signal generation unit for determining a corresponding time out according to the corresponding selection signal, and generating a corresponding time out signal when the voltage corresponding to the auxiliary winding of the power converter has no peak to cross an upper limit of the first reference voltage range and an upper limit of the second reference voltage range during the corresponding time out, or to cross the upper limit of the second reference voltage range during the corresponding time out, wherein the upper limit of the first reference voltage range is greater than the upper limit of the second reference voltage range; and
   a gate signal generation unit for entering the leakage current protection or a quasi-resonant mode according to the corresponding time out signal.

8. The controller of claim 7, wherein the gate signal generation unit entering the leakage current protection according to the corresponding time out signal is the gate signal generation unit not generating a gate signal corresponding to the quasi-resonant mode to a power switch of a primary side of the power converter according to the corresponding time out signal when the corresponding time out corresponds to the compensation voltage being greater than the threshold.

9. The controller of claim 7, wherein the gate signal generation unit entering the leakage current protection according to the corresponding time out signal is the gate signal generation unit generating a gate signal corresponding to a hiccup mode to a power switch of a primary side of the power converter according to the corresponding time out signal when the corresponding time out corresponds to the compensation voltage being greater than the threshold.

10. The controller of claim 7, wherein the gate signal generation unit entering the quasi-resonant mode according to the corresponding time out signal is the gate signal generation unit generating a gate signal corresponding to the quasi-resonant mode to a power switch of a primary side of the power converter according to the corresponding time out signal when the corresponding time out corresponds to the compensation voltage being less than the threshold.

11. The controller claim 7, wherein when the compensation voltage is less than the threshold and peaks of the voltage corresponding to the auxiliary winding of the power converter are continuously crossed the upper limit of the first reference voltage range or the upper limit of the second reference voltage range, the gate signal generation unit further enters the quasi-resonant mode according to a predetermined valley of the voltage corresponding to the auxiliary winding of the power converter.

12. An operation method of a controller, wherein the controller has leakage current protection of a diode, the diode is applied to a secondary side of a power converter, and the controller comprises a comparison unit, a reference voltage generation unit, a time out signal generation unit, and a gate signal generation unit, the operation method comprising:
  the comparison unit receiving a compensation voltage;
  the comparison unit outputting a corresponding selection signal according to the compensation voltage and a threshold;
  the reference voltage generation unit outputting a corresponding reference voltage range according to the corresponding selection signal;
  the time out signal generation unit determining a corresponding time out according to the corresponding selection signal;
  the time out signal generation unit generating a corresponding time out signal when a voltage corresponding to an auxiliary winding of the power converter has no peak to cross an upper limit of the corresponding reference voltage range during the corresponding time out; and
  the gate signal generation unit entering the leakage current protection or a quasi-resonant mode according to the corresponding time out signal.

13. The operation method of claim 12, wherein the gate signal generation unit entering the leakage current protection according to the corresponding time out signal comprises:
  the gate signal generation unit not generating a gate signal corresponding to the quasi-resonant mode to a power switch of a primary side of the power converter according to the corresponding time out signal when the corresponding time out corresponds to the compensation voltage being greater than the threshold.

14. The operation method of claim 12, wherein the gate signal generation unit entering the leakage current protection according to the corresponding time out signal comprises:
  the gate signal generation unit generating a gate signal corresponding to a hiccup mode to a power switch of a primary side of the power converter according to the corresponding time out signal when the corresponding time out corresponds to the compensation voltage being greater than the threshold.

15. The operation method of claim 12, wherein the gate signal generation unit entering the quasi-resonant mode according to the corresponding time out signal comprises:
  the gate signal generation unit generating a gate signal corresponding to the quasi-resonant mode to a power switch of a primary side of the power converter according to the corresponding time out signal when the corresponding time out corresponds to the compensation voltage being less than the threshold.

16. The operation method of claim 12, further comprising:
  the gate signal generation unit entering the quasi-resonant mode according to a predetermined valley of the voltage corresponding to the auxiliary winding of the power converter when the compensation voltage is less than the threshold and peaks of the voltage corresponding to the auxiliary winding of the power converter are continuously crossed the upper limit of the corresponding reference voltage range.

17. An operation method of a controller, wherein the controller has leakage current protection of a diode, the diode is applied to a secondary side of a power converter, and the controller comprises a comparison unit, a reference voltage generation unit, a time out signal generation unit, and a gate signal generation unit, the operation method comprising:
  the comparison unit receiving a compensation voltage;
  the reference voltage generation unit outputting a first reference voltage range according to first a plurality of peaks of a voltage corresponding to an auxiliary winding of the power converter, and outputting a second reference voltage range after first the plurality of peaks;
  the comparison unit outputting a corresponding selection signal according to the compensation voltage and a threshold;
  the time out signal generation unit determining a corresponding time out according to the corresponding selection signal;
  the time out signal generation unit generating a corresponding time out signal when the voltage corresponding to the auxiliary winding of the power converter has no peak to cross an upper limit of the first reference voltage range and an upper limit of the second reference voltage range, or to cross the upper limit of the second reference voltage range during the corresponding time out, wherein the upper limit of the first reference voltage range is greater than the upper limit of the second reference voltage range; and
  the gate signal generation unit entering the leakage current protection or a quasi-resonant mode according to the corresponding time out signal.

18. The operation method of claim 17, wherein the gate signal generation unit entering the leakage current protection according to the corresponding time out signal comprises:
  the gate signal generation unit not generating a gate signal corresponding to the quasi-resonant mode to a power switch of a primary side of the power converter according to the corresponding time out signal when the corresponding time out corresponds to the compensation voltage being greater than the threshold.

19. The operation method of claim 17, wherein the gate signal generation unit entering the leakage current protection according to the corresponding time out signal comprises:
  the gate signal generation unit generating a gate signal corresponding to a hiccup mode to a power switch of a primary side of the power converter according to the corresponding time out signal when the corresponding time out corresponds to the compensation voltage being greater than the threshold.

20. The operation method of claim 17, wherein the gate signal generation unit entering the quasi-resonant mode according to the corresponding time out signal comprises:
  the gate signal generation unit generating a gate signal corresponding to the quasi-resonant mode to a power switch of a primary side of the power converter according to the corresponding time out signal when the corresponding time out corresponds to the compensation voltage being less than the threshold.

21. The operation method of claim 17, further comprising:
the gate signal generation unit entering the quasi-resonant mode according to a predetermined valley of the voltage corresponding to the auxiliary winding of the power converter when the compensation voltage is less than the threshold and peaks of the voltage corresponding to the auxiliary winding of the power converter are continuously crossed the upper limit of the first reference voltage range or the upper limit of the second reference voltage range.

* * * * *